T. B. WHEELER.
Grain Sieve.
No. 8,601.
Patented Dec. 16, 1851.
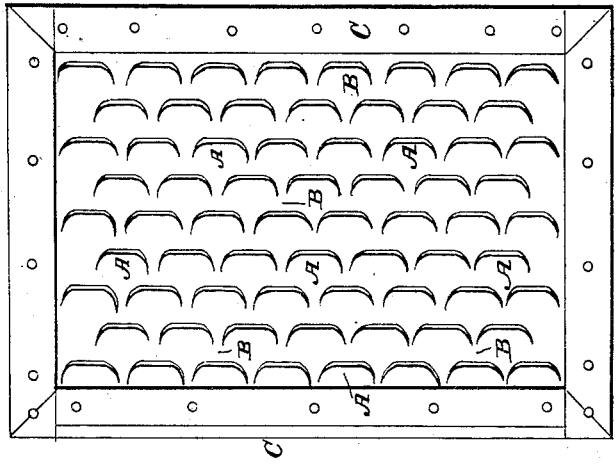
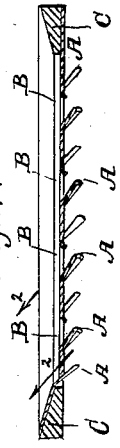
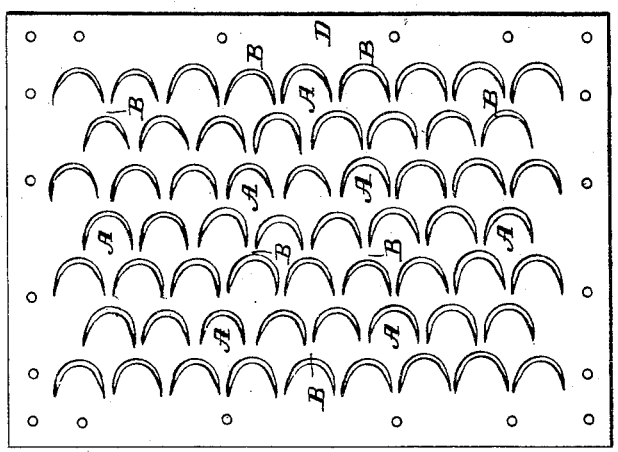

UNITED STATES PATENT OFFICE.

THOS. B. WHEELER, OF ALBANY, NEW YORK.

GRAIN-SIEVE.

Specification of Letters Patent No. 8,601, dated December 16, 1851.

*To all whom it may concern:*

Be it known that I, THOMAS B. WHEELER, of the city and county of Albany and State of New York, have invented a new and useful Improvement in Sieves for Separating Grain from Straw, Chaff, or any Refuse or Extraneous Matter; and I do hereby declare that the following is a full, clear, and exact description of the same, reference being had to the accompanying drawings, forming part of this specification, in which—

Figures 1, and 2 are plans of two modifications of my improvement. Fig. 3, is a transverse section of the modification shown in Fig. 1. Fig. 4, is a transverse section of that shown in Fig. 2.

Similar letters of reference indicate corresponding parts in each of the several figures.

The nature of my improvement consists in forming sieves of plates of metal provided with openings of semi-elliptical or other form having leaves below them inclining downward, from the plate, the said leaves having the surfaces either of convex, concave or other form, and their downward inclination being toward the side of the sieve from which the grain is fed or depositd upon them, or toward a blast of air, according to the nature of the separation to be effected.

To enable those skilled in the art to make and use my improvement I will proceed to describe fully its construction, and the effects produced by it.

The sieve represented in Figs. 1, and 3, is intended to be placed in a threshing machine to receive the grain and straw, as it leaves the threshing cylinder, and is designed to retain the straw and allow the grain and chaff to pass through. That represented in Figs. 2, and 4, is intended to be employed in a fanning mill, which may be either in connection with or independent of the threshing machine and is designed to separate, chaff and short straw from the grain.

The manner in which I make the sieve is as follows. I perforate the plate or cut it through with a chisel or cutter, or a series of chisels or cutters each of the form of the edge of one of the openings, which forms a series of leaves A, A, whose edges and the eyes of the plate from which they are cut are rounded slightly by the operation of cutting, giving the leaf a slightly convex form, on the side from which the cut is made, and a slightly concave form on the other side. I afterward bend the leaves by any suitable means, to any desired inclination from the level of the surface of the plate, bending them either from the concave or convex side. The sieve shown in Figs. 1, and 3, has its leaves bent from the concave side, the concavity of the leaves being on the upper side, and the edges of the openings being turned upward. The other sieve has its leaves bent in the opposite direction or from the convex side, which is upward, the edges of the holes turning slightly downward, the bending of the leaves makes openings B, B, in the plate corresponding in size and form with the leaves. The plates are secured on wooden frames C, C.

The object desired to be obtained in the sieve shown in Figs. 1, and 3, is that of more effectually preventing the straw passing through the sieve or entering the meshes and choking them up, and the manner in which it effects this object may be seen by referring to Fig. 2, in which the arrows 1, represent the direction in which the straw and grain comes to the sieve, the sieve being stationary in a horizontal position with its leaves inclining downward toward the side D. It may be understood that if the straw comes to an ordinary sieve in an inclined direction, however slight the inclination, its ends will have a tendency to work through the meshes or holes, and must then as it is carried forward, either pass through or stick in, now if they have any tendency to do so with this sieve they meet the inclined leaves, and instead of passing through, slide up over them and pass on over the sieve, the grain and small parts only passing through, the edges of the leaves toward the sides being turned up, and the leaves being slightly convex, the tendency of the straw to work into the corners and clog them is prevented.

The sieve shown in Figs. 2, and 4, when applied in a fanning mill, or in any separator in which a fan is used, will not allow any short straw that may be among the chaff, to pass through, though it might fall to it by its weight; the rounded or convex leaves and the rounded edges of the holes allow the grain to pass freely without impediment, and the inclination, of the leaves conducts the blast through the sieve, in such a direction as to carry the chaff and straw away toward the side of the sieve at which there is a proper opening to allow of its escape, (see the course of the arrows 2, 2, in Fig. 4.

What I claim as my invention and desire to secure by Letters Patent, is—

Forming sieves for separating grain from straw, chaff, and all extraneous matter, and for other analogous purposes, of sheet metal, with apertures B, B, cut or otherwise made in it, and inclined leaves A A, under the said apertures of corresponding form with the apertures themselves, substantially as herein set forth.

THOS. B. WHEELER.

Witnesses:
JNO. B. STURTEVANT,
EDWARD S. BEDELL,
THEODORE SHARP.